May 21, 1957 J. F. WOOD 2,793,254

CARTRIDGE CASE AND TURNOVER MECHANISM

Filed April 7, 1955 3 Sheets-Sheet 1

Inventor
John F. Wood
By Alois W. Graf Attorney

May 21, 1957 J. F. WOOD 2,793,254

CARTRIDGE CASE AND TURNOVER MECHANISM

Filed April 7, 1955. 3 Sheets-Sheet 2

Inventor
John F. Wood
By Alois W. Graf
attorney

May 21, 1957 J. F. WOOD 2,793,254

CARTRIDGE CASE AND TURNOVER MECHANISM

Filed April 7, 1955 3 Sheets-Sheet 3

Inventor
John F. Wood
By Alois W. Graf
attorney

United States Patent Office 2,793,254

Patented May 21, 1957

2,793,254

CARTRIDGE CASE AND TURNOVER MECHANISM

John F. Wood, Buchanan, Mich., assignor to Electro-Voice, Incorporated, Buchanan, Mich.

Application April 7, 1955, Serial No. 499,860

10 Claims. (Cl. 179—100.41)

This invention relates to cartridge case and turnover mechanisms, and more particularly to such mechanisms usable with a plurality of speeds of the recording medium and corresponding sensing devices.

Since the introduction of microgroove phonograph records it has been necessary to provide a plurality of phonograph cartridges each with a different stylus or a turnover phonograph cartridge with two different styli. The latter arrangement is more convenient than the use of individual plug-in cartridges. The turnover cartridges furthermore are generally in a lower price range and hence employ osmium or sapphire tipped styli. Such styli when worn must be replaced. At the present time about fifty different styli are stocked by a serviceman to provide exact replacement needles or styli for the more commonly used phonograph cartridges.

An owner of a phonograph cartridge may become aware of improper reproduction, and conclude that a new stylus will remedy the deficiency. Therefore, a new stylus is purchased with the hope that the correct one has been obtained. In many instances the stylus is quite small and in some phonograph pickup arms it is somewhat of a test of dexterity to replace a stylus. Consequently, the phonograph pickup cartridge is sometimes damaged when a stylus is changed. In some cases the piezoelectric element in the cartridge may have changed its characteristics, so mere replacement of the stylus does not provide a remedy.

In accordance with the present invention, it is proposed to overcome certain of the aforementioned disadvantages by providing a novel turnover cartridge and mechanism so that whenever a stylus seems to be worn or the cartridge appears to have changed characteristics, both cartridge and stylus may be replaced at a cost comparable to the present stylus replacement cost. Furthermore, replacement is to be made so convenient that no special tools or unusual dexterity is required. In the present instance the cartridge and two styli are contained in a device less than one-quarter inch in diameter and about three-quarters inch long. Such device incorporates certain constructional features so that it is economically possible to replace both the styli and the piezoelectric element when required.

It is, therefore, an object of this invention to provide a new and improved cartridge case and turnover mechanism.

Another object of this invention is to provide an improved cartridge case and turnover mechanism which can be indexed to a plurality of positions through the short and rotary motion of an adjusting means.

Another object of this invention is to provide an improved cartridge case and turnover mechanism in which the cartridge can be readily removed from its mounting sleeve.

Still another object of this invention is to provide an improved cartridge case and turnover mechanism which, while being simple and foolproof in design, is inexpensive to manufacture and maintain.

A further object is to provide an improved cartridge case and turnover mechanism which can be automatically turned over, that is changed, when the speed of the recording medium is changed.

Other objects and advantages of the invention will be apparent during the course of the following description when read in connection with the accompanying drawings, wherein.

Figures 1, 2, 10:
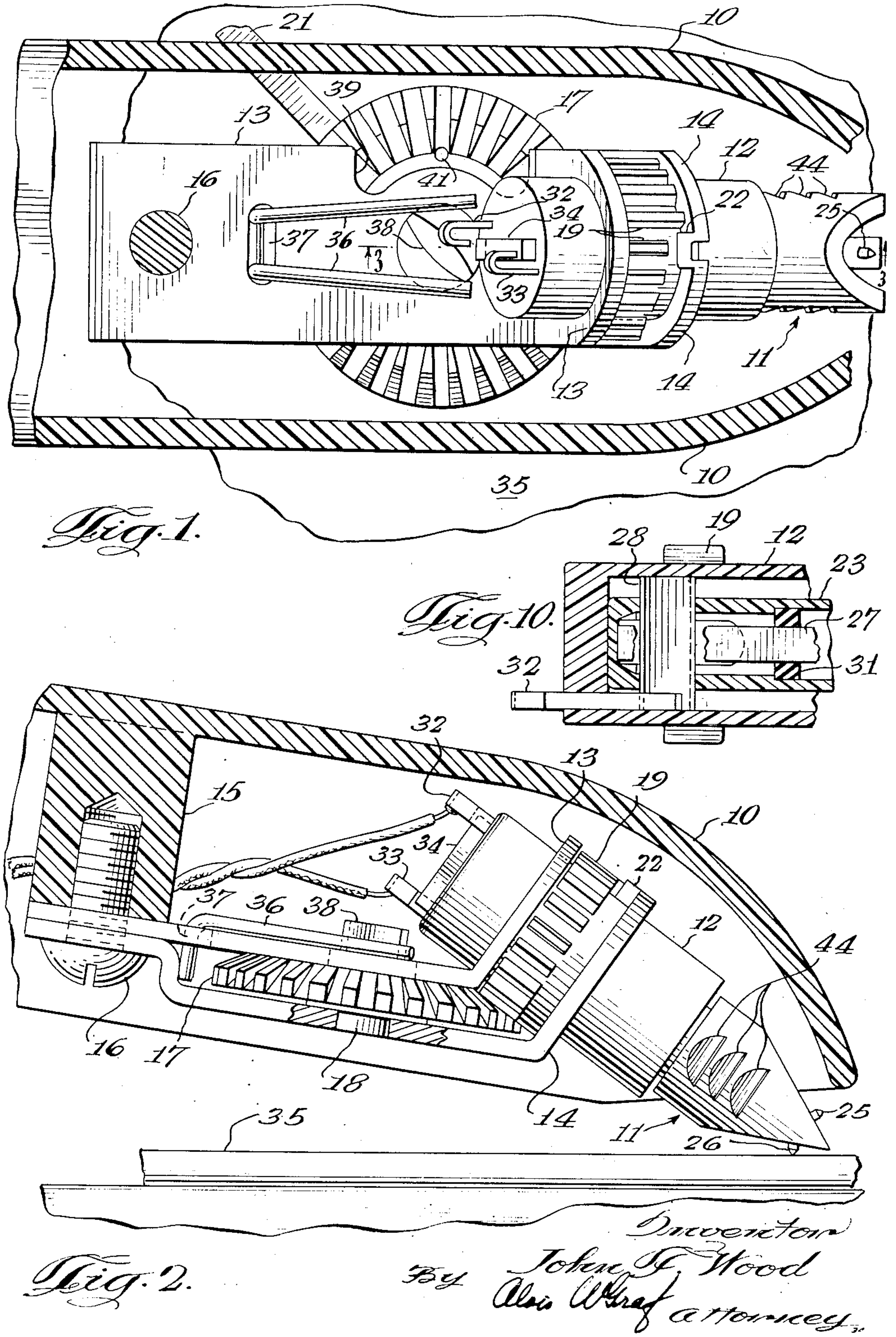
Figure 1 is a top view of the cartridge case and turnover mechanism with the tone arm broken away.
Figure 2 is a side elevational view of the cartridge case and turnover mechanism of this invention with the tone arm sectioned through the center of the mounting boss.
Figures 3, 4, 5:
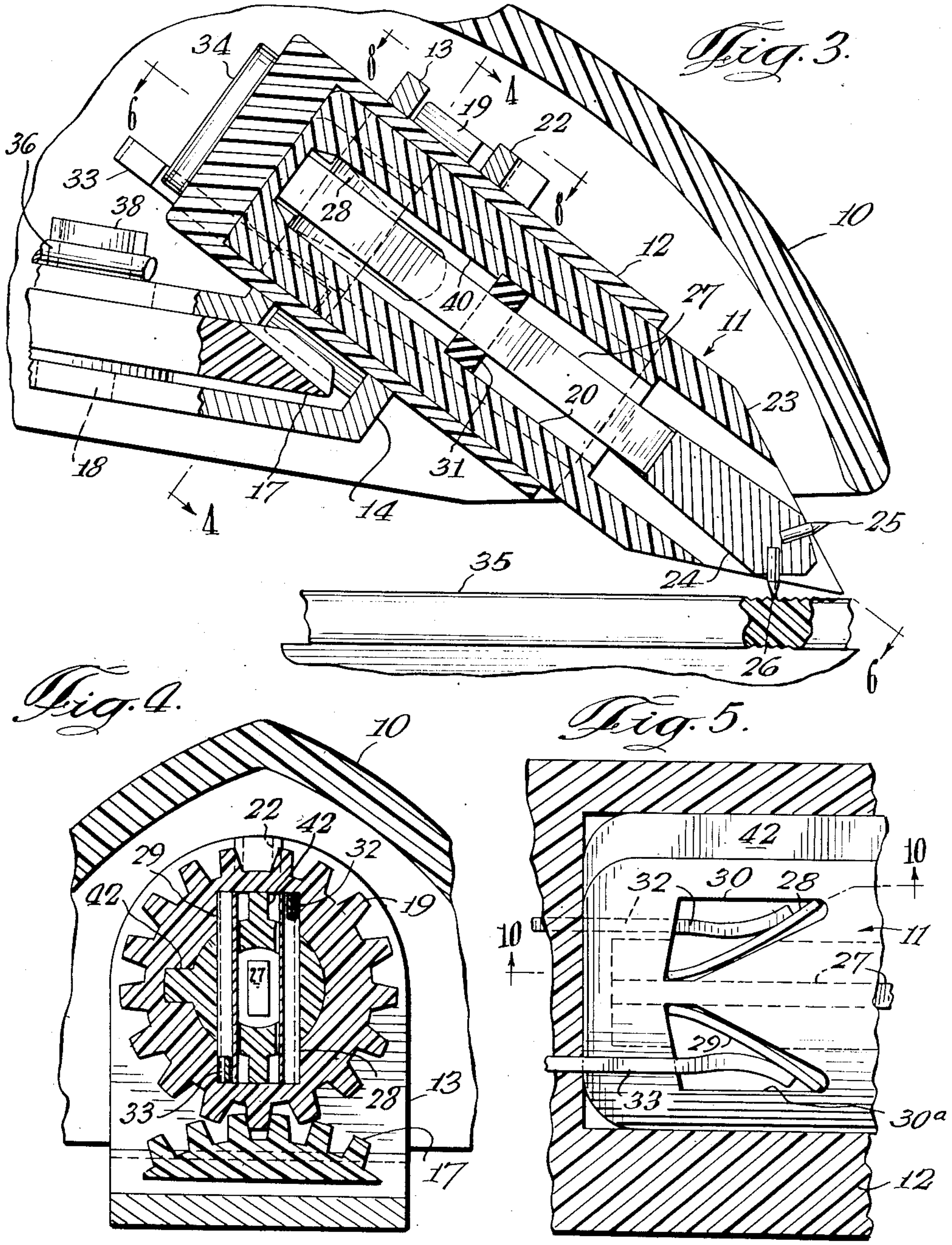
Figure 3 is a cross-sectional view of the tone arm, cartridge case and turnover mechanism assembly taken at 3—3 of Figure 1 along the center line through the assembly.
Figure 4 is a cross-sectional view taken at 4—4 of Figure 3.
Figure 5 is a broken away view of the cartridge case in its rotatable sleeve showing details of the contact blade and piezoelectric element assembly.
Figure 6:
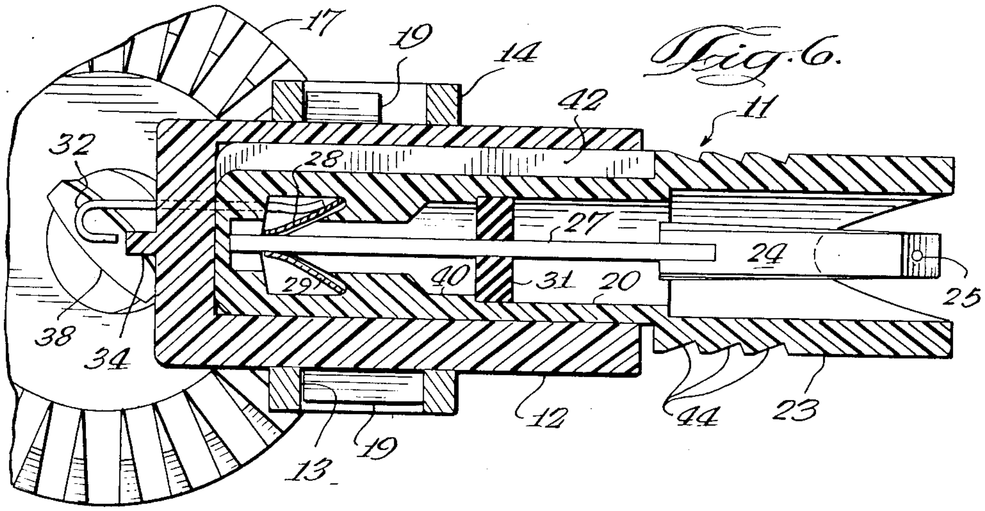
Figure 6 is a cross-sectional view taken at 6—6 of Figure 3.
Figure 7:
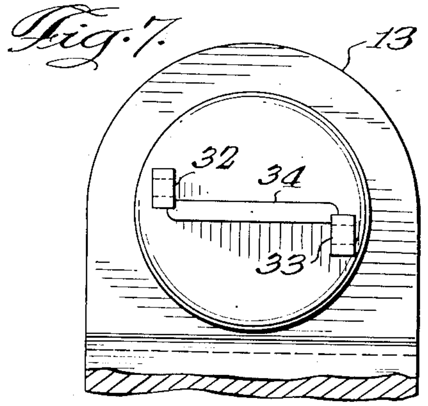
Figure 7 is a top view of the cartridge case assembly in its mounting sleeve and bracket.
Figure 8:
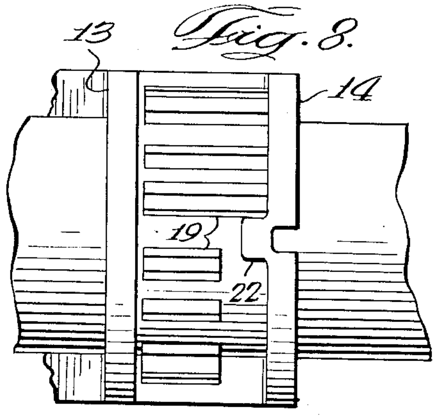
Figure 9:
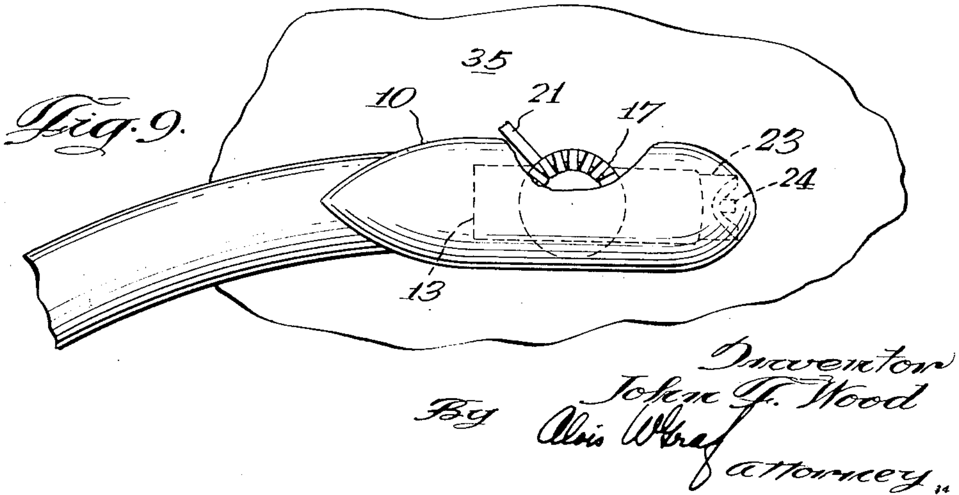

Figure 8 taken on line 8—8 of Figure 3 shows in an enlarged view details of the detent and gear teeth construction which limits rotation of the cartridge case to 180°;

Figure 9 shows in a broken away view the manner in which an actuating handle is connected to the toothed wheel of the turnover mechanism mounted in its tone arm; and Figure 10 is a cross-sectional view taken on line 10—10 of Figure 5 showing details of the contact blade mounting.

Referring now more particularly to Figures 1 and 3, there is shown a tone arm 10 within which is mounted a cartridge case 11. The cartridge case 11 is positioned within a sleeve 12 which is rotatably mounted in a bracket consisting of a top plate 13 and a bottom plate 14. The top plate 13 and the bottom plate 14 are mounted in a boss 15, which is an integral part of the tone arm 10, by a screw 16. The turnover mechanism for the sleeve 12 consists of a gear 17 which is mounted to rotate on a pin 18 between the top and bottom plates 13 and 14. The gear 17 engages mating teeth 19 fixed around the periphery of the sleeve 12. Rotation of the gear 17 may be effected by turning a handle 21 attached to the lower surface of the gear 17 (see Figure 9). A stop 22 is provided in the bottom plate 14 and cooperates with certain of the teeth 19 to limit rotation of the cartridge case and sleeve to 180°. This is accomplished by elongating at least two of the teeth 19, which are so spaced that their surfaces contacting stop 22 are 180° apart. In the present embodiment all of the teeth intermediate these two elongated teeth are also elongated to slightly less than the width of the gap between the top and bottom plates 13 and 14. Details of the stop structure are best shown in Figure 8.

Referring now to Figures 3–6 and 10 for details of the cartridge case structure, there is shown a cartridge housing 23, which may be made of a plastic material, within which are contained the essential cartridge elements. A needle cap 24 at one end of the housing 23 mounts, in the preferred embodiment, two styli or sensing elements 25, 26 having 1 mil and 3 mil tips, respectively. These correspond to the grooves of long playing and regular phonograph records. A transducing means or piezoelectric element 27 is connected at one end to the needle cap 24 and hinged, as it were, at its other end between two tilted rectangular plates or contacts 28 and 29. A damping pad 31 made of rubber or the like surrounds element 27 at an intermediate location. The contact blades 28 and 29 are respectively inserted in triangular recesses 30 and 30*a* in the cartridge case. The blades 28 and 29 make electrical contact with contacts 32 and 33, respectively, which extend through the sleeve 12. This is effected by a wiping action of the blades 28, 29, which extend all the way across the contacts 32 and 33, as the cartridge 23 is inserted into the sleeve 12 to deflect the blades 28, 29 against the sleeve contacts 32, 33. The angular position of these contact blades facilitates insertion of the cartridge case 11, and at the same time prevents accidental loosening of the case due to vibration. The sleeve contacts 32 and 33 extend through the sleeve 12, are slightly twisted to lock them in place, and are then bent over adjacent a rectangular protrusion 34 of the sleeve 12 to connect to wire conductors, as is well known in the art.

The hinged support of the piezoelectric element 27 by the contact members 28 and 29 has several advantages. It eliminates the usual rubber pad at the end of the element 27, which in a device as small as this would present increased assembly difficulties. The contact members 28 and 29 not only provide electrical contact with opposite sides of the element 27, but also provide an arrangement which improves the response characteristic of the element. The elements 28 and 29 also provide convenient electrical contacts which make sliding or wiping contacts with the two cooperating contacts 32 and 33 in the support sleeve 12. It will be noted that the damping pad 31 is accurately positioned by having it engage a shoulder formed where the two different diameter bores 20 and 40 of the case 28 meet. Thus, again provision has been made for rapid mass production assembly of the cartridge and styli.

It also may be noted that the open end of the casing 23 is defined by two planes at an acute angle to each other which intersect at the axis of the casing. Thus, two acute angled extremities are located adjacent the styli 25 and 26. Thus, if the cartridge is dropped on the record, no damage occurs because the extremities are engaged and preclude bending the element 27 beyond a predetermined safe amount.

In operation, signals recorded on the surface 35 are picked up by the appropriate stylus 25 or 26 and converted from mechanical to electrical energy by the piezoelectric element 27. The electrical signal is then conducted from blades 28 and 29 to the externally accessible contacts 32 and 33. To position the cartridge from its regular speed needle tip position to its long playing speed needle tip position, the sleeve 12 is rotated by means of the gear 17 previously discussed. These two needle tip positions are accurately maintained by a spring 36 which is fixed to the top plate 13 through an aperture 37. The spring 36 engages a positioning wheel 38 which is fixed to the pin 18 mounting the gear 17.

In addition to the manual positioning means provided by the handle 21, the positioning can be accomplished automatically by a thrust wire connected through the cutout 39 engaging a small hole 41 in the gear 17. This thrust wire (not shown) is operated from the turntable speed change mechanism so that as speed is changed from long playing to regular speed, or vice versa, the cartridge is automatically turned over to its proper position.

It should be noted that the cartridge case 11 is provided with a key 42 (see Figure 4) which engages a mating slot in the sleeve 12, and the cartridge case is, therefore, accurately positioned in said sleeve. To facilitate the insertion and withdrawal of the cartridge case in its sleeve, grips 44 are provided in the casing surface.

While there has been shown and described an invention in connection with certain specific embodiments, it will, of course, be understood that it is not intended nor wished to be limited thereto since it is apparent that the principles herein disclosed are susceptible of numerous other applications, and modifications may be made in the structural arrangement and in the instrumentalities employed without departing from the spirit and scope of this invention as set forth in the appended claims.

I claim as my invention:

1. A cartridge case and turnover mechanism comprising a sleeve, a cartridge in said sleeve having a plurality of sensing elements connected to transducing means for converting mechanical variations of the recording medium sensed by the sensing elements into electrical signals and a pair of inclined plates contacting said transducing means for conducting said electrical signals to a pair of contacts, said inclined plates being positioned in said sleeve so as to hold said cartridge firmly within said sleeve, gear teeth on the outside of said sleeve, a portion of said teeth being longer than the rest, mounting means for said sleeve having a limit stop, said stop engaging at least one of the longer of said teeth so as to limit the rotational movement of said sleeve in said bracket, a gear mounted on said bracket to mesh with said sleeve gear teeth, said gear being movable to position said cartridge in a plurality of positions corresponding to said plurality of sensing elements, and a spring fixed to said mounting means, said spring engaging a positioning wheel connected to said bracket-mounting gear so as to maintain said cartridge in any one of said cartridge positions.

2. A cartridge case and turnover mechanism comprising a sleeve, a cartridge in said sleeve having a plurality of sensing elements connected to transducing means for converting mechanical variations of the recording medium sensed by the sensing elements into electrical signals and a pair of plates contacting said transducing means for conducting said electrical signals to a pair of contacts, said plates being positioned in said sleeve so as to hold said cartridge firmly within said sleeve, teeth on the outside of said sleeve, at least one of said teeth being longer than the rest, mounting means for said sleeve having a limit stop, said stop engaging the longer of said teeth so as to limit the rotational movement of said sleeve in said bracket, and a gear mounted on said bracket to mesh with said sleeve teeth, said gear being movable to position said cartridge in a plurality of positions corresponding to said plurality of sensing elements.

3. A cartridge case and turnover mechanism comprising a sleeve, a multi-position cartridge in said sleeve, teeth on the outside of said sleeve, at least one of said teeth being longer than the rest, mounting means for said sleeve having a limit stop, said stop engaging the longer of said teeth so as to limit the rotational movement of said sleeve in said bracket, a gear mounted on said bracket to mesh with said sleeve teeth, said gear being movable to position said cartridge in a plurality of positions.

4. A cartridge case and turnover mechanism comprising a sleeve, a multi-position cartridge in said sleeve, teeth on the outside of said sleeve, at least one of said teeth being longer than the rest, mounting means for said sleeve having a limit stop, said stop engaging the longer of said teeth so as to limit the rotational movement of said sleeve in said bracket, a gear mounted on said bracket to mesh with said sleeve teeth, said gear being movable to position said cartridge in a plurality of positions, and a spring fixed to said bracket, said spring engaging a positioning wheel connected to said bracket-mounted gear so as to maintain said cartridge in any one of said cartridge positions.

5. A phonograph pickup cartridge comprising an elongated casing having an axial bore extending from one open end to the other closed end, said open end being defined by two planes intersecting each other at the axis of the casing, said bore adjacent said closed end being of smaller diameter than at the other end thereby forming at an intermediate point an annular shoulder, a pair of apertures adjacent said closed end extending transverse to and spaced from the axis of said casing and intersecting the bore adjacent said closed end, a pair of sheet metal contact members mounted in said apertures at angles toward each other and toward the end of said casing, said members projecting at both their ends from said casing, an elongated piezoelectric element having at an intermediate point a damping pad arranged to fit within the larger axial bore and to engage said annular shoulder, one end of said element being positioned between and supported by said contact members, and a member affixed to and supported by the other free end of said element carrying a plurality of phonograph styli.

6. A phonograph cartridge comprising an elongated casing having an axial bore extending from one open end to the other closed end, said bore adjacent said closed end being of smaller diameter than at the other end thereby forming at an intermediate point an annular shoulder, a plurality of apertures adjacent said closed end extending transverse to the axis of said casing and intersecting the bore adjacent said closed end, a pair of metal contact members mounted in said apertures at angles toward each other and toward the end of said casing, each contact member having a curved edge portion, an elongated piezoelectric element having at an intermediate point a damping pad arranged to fit within the larger axial bore and to engage said annular shoulder, one end of said element being positioned between and hingedly supported by the curved portions of said contact members, and a rigid member affixed to the other end of said element and carrying a rigid phonograph stylus.

7. A phonograph pickup cartridge comprising an elongated casing having an axial cavity extending from one open end to the other closed end, said cavity adjacent said closed end being of smaller diameter than at the other end thereby forming at an intermediate point an annular shoulder, a pair of apertures adjacent said closed end extending transverse to and spaced from the axis of said casing and intersecting the cavity adjacent said closed end, a pair of sheet metal contact members mounted in said apertures at angles toward each other and toward the end of said casing, adjacent portions of said contact members within said cavity terminating in curved surfaces, an elongated piezoelectric element having at an intermediate point a damping pad arranged to fit within the larger axial cavity and to engage said annular shoulder, one end of said element being positioned between and supported only by the curved surfaces of said contact members, and a rigid member affixed to the other end of said element carrying a plurality of phonograph styli, each of said styli being at an acute angle relative to the axis of said element.

8. A phonograph pickup cartridge comprising an elongated casing having an axial bore extending from one open end to a closed end, said bore adjacent said closed end being of smaller diameter thereby forming an intermediate annular shoulder, a plurality of apertures adjacent said closed end intersecting said smaller axial bore, a flat elongated piezoelectric element having at an intermediate point a damping pad arranged to fit within the larger axial bore and to engage said annular shoulder, said element being mounted along the axis of said bore, a pair of metal contact members mounted in said apertures each having a curved portion for engaging opposite flat sides of said piezoelectric element adjacent the end thereof to provide a hinge-like support of one end of said element, and a rigid stylus carrying member rigidly mounted on the other free end of said element and extending to the exterior of said casing.

9. A phonograph pickup cartridge comprising an elongated casing having an axial cavity extending from one open end to the other closed end, said cavity adjacent said closed end being of smaller dimensions than at the other end thereby forming at an intermediate point a shoulder, a plurality of apertures adjacent said closed end extending transverse to the axis of said casing and intersecting the cavity adjacent said closed end, a pair of sheet metal contact members mounted in said apertures at angles toward each other and toward the end of said casing, an elongated piezoelectric element having at an intermediate point a damping pad arranged to fit within the larger cavity and to engage said shoulder, one end of said element being positioned between and hingedly supported by edge portions of said sheet metal contact members, and a member affixed to and supported by the other free end of said element carrying a phonograph stylus.

10. A phonograph pickup cartridge comprising an elongated casing having an axial cavity extending from one open end to a closed end, a plurality of apertures adjacent said closed end intersecting said axial cavity, a flat elongated piezoelectric element mounted along the axis of said cavity, and a pair of sheet metal contact members mounted in said apertures each having a curved portion within said casing for engaging opposite flat sides of said piezoelectric element adjacent the inner end thereof to provide a hinge-like support, said contact members each extending beyond the exterior of said casing transversely at right angles to the axis of said cavity.

References Cited in the file of this patent

UNITED STATES PATENTS

| | | |
|---|---|---|
| 2,645,498 | Miller et al. | July 14, 1953 |
| 2,668,196 | Bauer | Feb. 2, 1954 |
| 2,703,343 | Snepvangers | Mar. 1, 1955 |
| 2,717,929 | Klingener | Sept. 13, 1955 |